(12) United States Patent
Chin

(10) Patent No.: US 10,268,190 B2
(45) Date of Patent: Apr. 23, 2019

(54) VEHICLE AND CONTROLLING METHOD FOR THE SAME

(71) Applicant: Hyundai Motor Company, Seoul (KR)

(72) Inventor: Kyuhwan Chin, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 168 days.

(21) Appl. No.: 15/384,577

(22) Filed: Dec. 20, 2016

(65) Prior Publication Data

US 2017/0285634 A1 Oct. 5, 2017

(30) Foreign Application Priority Data

Mar. 30, 2016 (KR) .......................... 10-2016-0038470

(51) Int. Cl.
*G05D 1/00* (2006.01)
*G05D 1/02* (2006.01)
*G08C 17/00* (2006.01)
*B60R 25/00* (2013.01)

(52) U.S. Cl.
CPC ........... *G05D 1/0022* (2013.01); *B60R 25/00* (2013.01); *G05D 1/0212* (2013.01); *G08C 17/00* (2013.01)

(58) Field of Classification Search
None
See application file for complete search history.

(56) References Cited

U.S. PATENT DOCUMENTS

| | | | | |
|---|---|---|---|---|
| 9,905,064 | B2 * | 2/2018 | Ohshima | ............ B60R 25/2018 |
| 9,963,108 | B2 * | 5/2018 | Nishidai | ............... B60R 16/037 |
| 2011/0257817 | A1 * | 10/2011 | Tieman | .................... B60R 25/24 |
| | | | | 701/2 |
| 2012/0092129 | A1 * | 4/2012 | Lickfelt | .................. B60R 25/24 |
| | | | | 340/5.72 |
| 2012/0095642 | A1 * | 4/2012 | Nishida | ................. H04L 9/3226 |
| | | | | 701/31.4 |
| 2015/0120151 | A1 | 4/2015 | Akay et al. | |
| 2015/0127208 | A1 | 5/2015 | Jecker et al. | |
| 2016/0264132 | A1 * | 9/2016 | Paul | ...................... B60W 30/06 |
| 2017/0241188 | A1 * | 8/2017 | Kalhous | .................. E05F 15/40 |

FOREIGN PATENT DOCUMENTS

| | | |
|---|---|---|
| JP | 2000-54699 A | 2/2000 |
| JP | 5785298 B2 | 9/2015 |
| JP | 2015-534921 A | 12/2015 |
| KR | 10-1180888 B1 | 9/2012 |
| KR | 10-2013-0037947 A | 4/2013 |
| KR | 10-1375306 B1 | 3/2014 |
| KR | 10-2015-0047277 A | 5/2015 |

\* cited by examiner

*Primary Examiner* — Mussa A Shaawat
*Assistant Examiner* — Abdhesh K Jha
(74) *Attorney, Agent, or Firm* — Mintz Levin Cohn Ferris Glovsky and Popeo, P.C.; Peter F. Corless

(57) ABSTRACT

A vehicle includes: a communication unit performing low frequency (LF) communication and radio frequency (RF) communication with a fob key and performing short-range communication with a portable device; and a controller estimating a position of a user having the fob key using the LF and RF communication with the fob key and controlling a connection between the portable device and the communication unit according to the estimated position of the user using the short-range communication with the portable device.

16 Claims, 14 Drawing Sheets

200

VEHICLE AND CONTROLLING METHOD FOR THE SAME

CROSS-REFERENCE TO RELATED APPLICATION

This application claims the benefit of and priority to Korean Patent Application No. 10-2016-0038470, filed on Mar. 30, 2016 in the Korean Intellectual Property Office, the disclosure of which is incorporated herein by reference as if fully set forth herein.

BACKGROUND

1. Technical Field

Embodiments of the present disclosure relate generally to a vehicle and a controlling method for the same and, more specifically, to a vehicle capable of estimating a position of a driver via wireless communication with a fob key and performing remote control using a portable device according to the estimated position of the driver and a controlling method for the same.

2. Description of Related Art

Conventional vehicle key systems can allow a driver to open and close a door of a vehicle or turn on an ignition of the vehicle without inserting a key into a key box in the vehicle. Frequently, a smart card or a fob key, i.e., fob, for a wireless communication is used in the vehicle key system.

Since a locking operation can be automatically transmitted via low frequency (LF) communication and radio frequency (RF) communication with the fob key when a driver carrying the fob key approaches a vehicle, the driver may open a vehicle door without inserting a key or start the ignition without inserting an ignition key. Further, the vehicle may perform wireless communication with a portable device providing a user interface, aside from the fob key, and the driver may thus remotely control the vehicle via the user interface provided by the portable device.

SUMMARY

It is an aspect of the present disclosure to provide a vehicle capable of estimating a position of a driver via wireless communication with a fob key and performing remote control by a portable device according to the estimated position of the driver and a controlling method for the same.

Additional aspects of the present disclosure will be set forth in part in the description which follows and, in part, will be apparent from the description, or may be learned by practice of the present disclosure.

In accordance with embodiments of the present disclosure, a vehicle includes: a communication unit performing low frequency (LF) communication and radio frequency (RF) communication with a fob key and performing short-range communication with a portable device; and a controller estimating a position of a user having the fob key using the LF and RF communication with the fob key and controlling a connection between the portable device and the communication unit according to the estimated position of the user using the short-range communication with the portable device.

The communication unit may receive strength information of a LF signal from the fob key, and the controller may estimate the position of the user based on the received strength information of LF signal.

The controller may estimate a distance between the user and the vehicle based on the strength information of LF signal and permit the connection between the portable device and the communication unit when the estimated distance between the user and the vehicle is less than a predetermined reference distance.

The controller may establish a plurality of vehicle controllable areas having a predetermined range from the vehicle and control the connection between the portable device and the communication unit using the short-range communication according to a vehicle controllable area among the plurality of vehicle controllable areas in which the user is located.

The plurality of vehicle controllable areas may include a first area and a second area, the controller may block the connection between the portable device and the communication unit when the user is located in the first area and permits the connection between the portable device and the vehicle when the user is located in the second area.

The vehicle may further include a storage unit storing a first authentication code, and the communication may receive a second authentication code from the portable device, and the controller may permit the connection between the portable device and the communication unit when the distance between the user and the vehicle is less than a predetermined reference distance and the first authentication code stored in the storage unit is identical to the second authentication code received from the portable device.

The communication unit may transmit position information of the user to the portable device.

The controller may establish a retrieving start point of the vehicle and a retrieving completion point of the vehicle and determine an overlapping area of a vehicle controllable area at the retrieving start point of the vehicle and a vehicle controllable area at the retrieving completion point of the vehicle as a recommended control position.

The communication unit may receive a retrieving command from the portable device, and in response to receiving the retrieving command, the controller may determine whether the recommended control position is identical to the estimated position of the user and moves the vehicle to the retrieving completion point when it is determined that the recommended control position is identical to the estimated position of the user.

The controller may stop retrieving control of the vehicle when it is determined that the recommended control position is not identical to the estimated position of the user.

The communication unit may transmit information related to the recommended control position to the portable device.

Furthermore, in accordance with embodiments of the present disclosure, a controlling method of a vehicle includes: performing low frequency (LF) communication and radio frequency (RF) communication with a fob key; performing short-range communication with a portable device; estimating a position of a user having the fob key using the LF and RF communication with the fob key; and controlling a connection between the portable device and a communication unit of the vehicle according to the estimated position of the user using the short-range communication with the portable device.

The performing of the LF and RF communication with the fob key may include receiving strength information of a LF signal from the fob key, and the estimating of the position of the driver may include estimating a position of the user based on the received strength information of LF signal.

The estimating of the position of the driver may include estimating a distance between the user and the vehicle based on the strength information of the LF signal, and the controlling of the connection between the portable device and the communication unit may include permitting a connection between the portable device and the communication unit when the distance between the user and the vehicle is less than a predetermined reference distance.

The controlling of the connection between the portable device and the communication unit may include establishing a plurality of vehicle controllable areas having a predetermined range from the vehicle and controlling the connection between the portable device and the communication unit using the short-range communication according to a vehicle controllable area among the plurality of vehicle controllable areas in which the user is located.

The controlling of the connection between the portable device and the communication unit may include receiving a second authentication code from the portable device; and permitting the connection between the portable device and the communication unit when the distance between the user and the vehicle is less than the predetermined reference distance and a first authentication code stored in a storage unit is identical to the second authentication code received from the portable device.

The controlling method may further include: transmitting position information of the user to the portable device.

The controlling method may further include: establishing a retrieving start point of the vehicle and a retrieving completion point of the vehicle and determining an overlapping area of a vehicle controllable area at the retrieving start point and a vehicle controllable area at the retrieving completion point as a recommended control position.

The controlling method may further include: receiving a retrieving command from the portable device; in response to receiving the retrieving command, determining whether the recommended control position is identical to the estimated position of the user; and moving the vehicle to the retrieving completion point when it is determined that the recommended control position is identical to the estimated position of the user.

The controlling method may further include: stopping retrieving control of the vehicle when it is determined that the recommended control position is not identical to the estimated position of the user.

BRIEF DESCRIPTION OF THE DRAWINGS

These and/or other aspects of the disclosure will become apparent and more readily appreciated from the following description of embodiments, taken in conjunction with the accompanying drawings of which.

Figure 1:
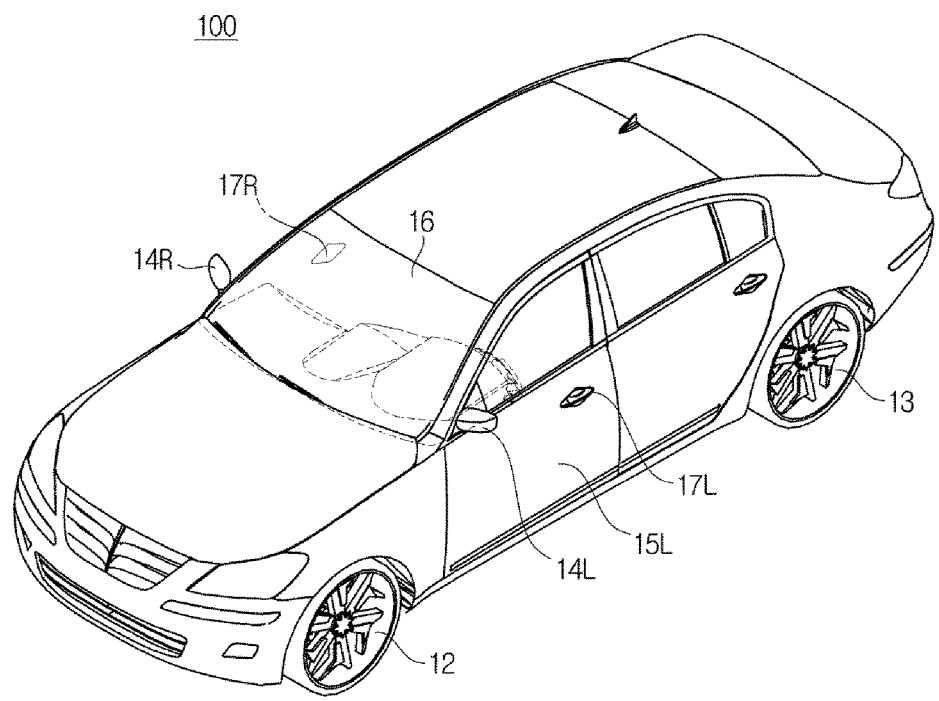
FIG. 1 is an exterior view of a vehicle in accordance with embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, embodiments will now be described more fully hereinafter with reference to the accompanying drawings. The embodiments may, however, be embodied in many different forms and should not be construed as being limited to the embodiments set forth herein. These embodiments are provided so that this disclosure will be thorough and complete and will fully convey the embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Reference will now be made in detail to the embodiments of the present disclosure, examples of which are illustrated in the accompanying drawings, wherein like reference numerals refer to like elements throughout.

Figure 2:
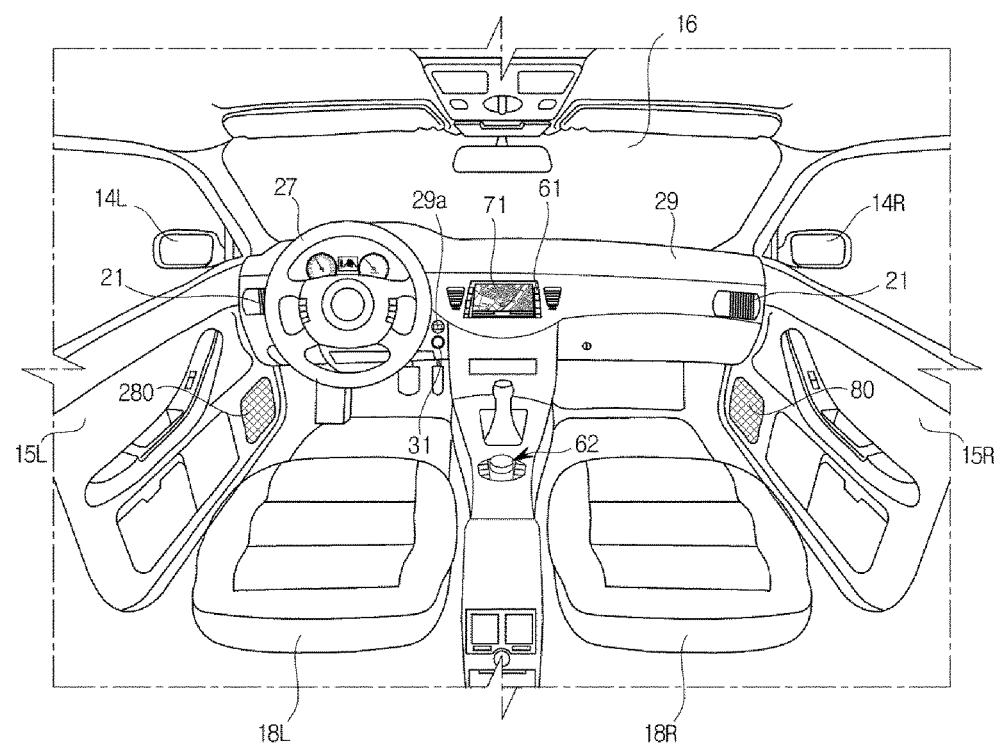
FIG. 2 is a view of a configuration of the interior of the vehicle in accordance with embodiments of the present disclosure.

FIG. 1 is an exterior view of a vehicle in accordance with embodiments of the present disclosure, and FIG. 2 is a view of a configuration of the interior of the vehicle in accordance with embodiments of the present disclosure.

Referring first to FIG. 1, an exterior of a vehicle 100 may include vehicle wheels 12 and 13 moving the vehicle 100, a door 15L closing the inside of the vehicle 100 from the outside, a front glass 16 providing a front view of the vehicle 100 to a driver inside the vehicle 100, and a side mirror 14L and 14R providing a view of a rear side of the vehicle 100 to the driver.

The vehicle wheels 12 and 13 may include a front wheel 12 provided on the front of the vehicle and a rear wheel 13 provided on the rear of the vehicle. A driving device (not shown) provided inside of the vehicle 100 may supply a torque to the front wheel 12 and the rear wheel 13 so that the vehicle 100 may be moved forward and backward. The driving device may employ an engine configured to generate a torque by burning fossil fuel or a motor configured to generate a torque by receiving power source from a capacitor.

The door 15L and 15R (refer to FIG. 2) may be rotatably provided on the left side and the right side of the vehicle 100. When the door 15L and 15R is opened, a driver may be allowed to be seated in the vehicle 100, and when the door 15L and 15R is closed, the inside of the vehicle 100 may be closed from the outside. Further, a handle 17L and 17R may be provided on the outside of the vehicle 100 to open and close the door 15L and 15R (refer to FIG. 2), and a low frequency (LF) antenna (not shown) configured to transmit a LF signal may be mounted on the handle 17L and 17R.

The LF antenna may be included in a LF communication unit 111 (refer to FIG. 6) provided in the front, rear, and later side of the body and the inside of the body and configured to transmit a LF signal in various angles and strengths. According to a position of the LF antenna, the strength and the direction of the LF signal that is received by a fob key 200 may vary.

When authentication between the fob key 200 (refer to FIG. 3) and the vehicle 100 is completed via the wireless communication, a door lock of the vehicle 100 may be released, and the door 15L may be opened by pulling the handle 17L by the user. However, when the fob key 200 is moved to the out of a predetermined distance, the door lock may be locked.

The front glass 16 may be provided on an upper portion of the front of the body to allow a driver inside the vehicle 100 to acquire visual information about the forward of the vehicle 100 and may be referred to as "windshield glass".

The side mirror 14L and 14R may include a left side mirror 14L provided on the left side of the vehicle 100 and a right side mirror 14R provided on the right side of the vehicle 100, and may allow a driver inside the vehicle 100 to acquire visual information of the side and the rear of the vehicle 100.

In addition, the vehicle 100 may include a detector, e.g., a proximity sensor configured to detect an obstacle and another vehicle in the rear or the side, and a rain sensor configured to detect whether to rain and an amount of rain.

The proximity sensor may send a detection signal to the lateral side or the rear side of the vehicle, and may receive a reflection signal reflected from an obstacle or another vehicle. The proximity sensor may sense whether an obstacle exists in the rear side of the vehicle 100 based on the waveform of the received reflection signal, and may detect a position of the obstacle. Such a proximity sensor may employ a method of emitting ultrasonic waves and detecting a distance to an obstacle by using the reflected ultrasonic waves from the obstacle.

It should be understood that the exterior arrangement of the vehicle 100 is described herein and shown in FIG. 1 merely for demonstration purposes only and does not limit the scope of the present disclosure. The exterior arrangement of the vehicle 100 may be modified in any suitable manner in accordance with the claims defined herein.

Referring next to FIG. 2, in a center area of a dashboard 29, an Audio-Video-Navigation (AVN) display 71 and an AVN input 61 may be provided. The AVN display 71 may selectively display at least one of an audio screen, a video screen and a navigation screen, as well as various control screens related to the vehicle 100 or a screen related to an additional function.

The AVN display 71 may be implemented by LCD (Liquid Crystal Display), LED (Light Emitting Diode), PDP (Plasma Display Panel), OLED (Organic Light Emitting Diode), and CRT (Cathode Ray Tube).

The AVN input 61 may be provided in a hard key type on an area adjacent to the AVN display 71. Alternatively, when the AVN display 71 is implemented by a touch screen, the AVN input 61 may be provided in a touch panel type on a front surface of the AVN display 71.

A center input 62 in the type of a jog shuttle may be provided between a driver seat 18L and a passenger seat 18R. A user may input a control command by rotating and pressing the center input 62 or sliding the center input 62 in four directions of up, down, left and right.

An audio output unit 80 may be provided in the vehicle 100 to output sound, and the audio output unit 80 may correspond to a speaker. The audio output unit 80 may output sound that is required to perform an audio function, a video function, a navigation function and an additional function.

A steering wheel 27 may be provided on the dashboard 29 in the side of the driver seat 18L, and a key home 29a to which the fob key 200 (refer to FIG. 3) is inserted may be formed on an area adjacent to the steering wheel 27. When the fob key 200 is inserted in the key home 29a or when authentication between the fob key 200 and the vehicle 100 is completed via the wireless communication, the fob key 200 and the vehicle 100 may be connected to each other.

An ignition button 31 configured to control turning on/off an ignition of the vehicle 100 may be provided in the dashboard 29. When the fob key 200 is inserted in the key home 29a or when the authentication between the fob key 200 and the vehicle 100 is completed via the wireless communication, an ignition of the vehicle 100 may be turned on by pressing of the ignition button 31 by the user.

Meanwhile, the vehicle 100 may perform heating and cooling since an air conditioning device is provided in the vehicle 100. The vehicle 100 may control an internal temperature of the vehicle 100 by discharging air that is heated or cooled via a vent 21.

It should be understood that the interior arrangement of the vehicle 100 is described herein and shown in FIG. 2 merely for demonstration purposes only and does not limit the scope of the present disclosure. The interior arrangement of the vehicle 100 may be modified in any suitable manner in accordance with the claims defined herein.

Figure 3:
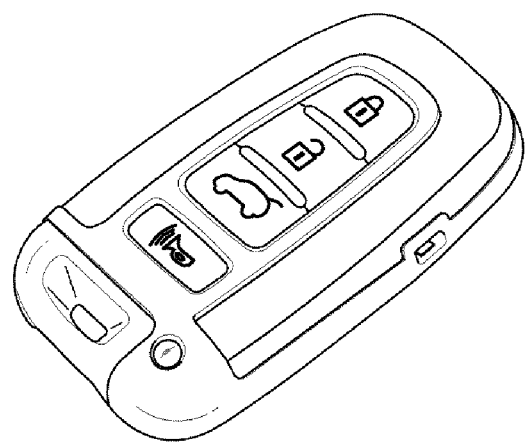
FIG. 3 is a view of a fob key in accordance with embodiments of the present disclosure.

FIG. 3 is a view of a fob key in accordance with embodiments of the present disclosure.

The fob key 200 may be connected to the vehicle 100 by a transmission and reception of a wired or a wireless signal.

The fob key 200 may be connected to the vehicle 100 via low frequency (LF) communication and radio frequency (RF) communication.

The LF communication may represent a communication of a low frequency band, which is used for the vehicle 100 to transmit and receive a LF signal for scanning the fob key 200. For example, the LF communication may have a frequency band of 20 kHz~150 kHz. When transmitting and receiving a LF signal via the LF communication network, a transmittable and receivable distance of the signal may be less than a transmittable and receivable distance of the RF communication having a high frequency band, due to the characteristics of the low frequency band. For example, a transmittable and receivable distance of the LF communication may be approximately 12 m and, and a transmittable and receivable distance of the RF communication may be approximately 100 m.

Therefore, since the vehicle 100 transmits and receives a LF signal via the LF communication network, the vehicle 100 may scan the fob key 200 in the surrounding of the vehicle 100.

The RF communication may represent a communication of a high frequency band, which is used for the vehicle 100 to receive a RF signal from the fob key 200 receiving the LF signal. For example, the RF communication may have a frequency band of 315 MHz~433 MHz. When transmitting and receiving a RF signal via the RF communication network, a transmittable and receivable distance of the signal may be longer than a transmittable and receivable distance of the LF communication having a low frequency band.

The LF signal may include a scanning signal to scan the fob key 200 of the surrounding of the vehicle 100 (i.e., within the LF signal transmittable and receivable distance)

The RF signal may include a scanning response signal generated by the fob key 200 to respond to the scanning signal.

On the fob key 200, a button configured to allow a remote control of the vehicle 100 may be provided, wherein the remote control may include locking or unlocking of a door lock of the vehicle 100, opening a lid of a trunk, and honking a horn.

The type of the fob key 200 is not limited to FIG. 3, and thus the fob key 200 may include an input device configured to control the vehicle 100, e.g. releasing a door lock via the LF and RF communication network, turning on an ignition and starting a driving.

The fob key 200 may be sold with the vehicle 100 and authentication information may be pre-stored in the fob key 200 for the communication with the vehicle 100.

Figure 4:
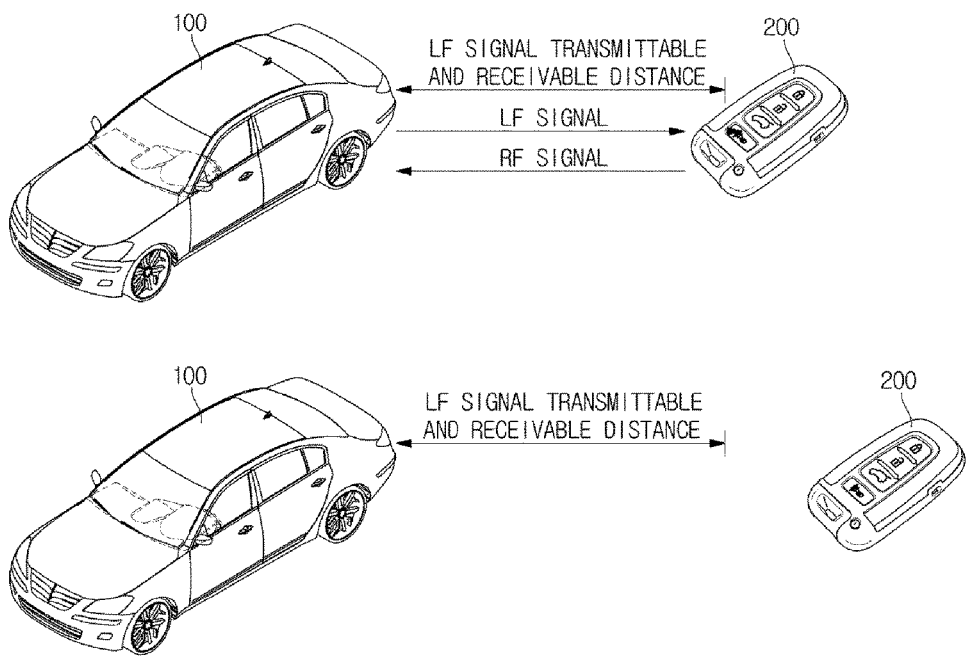
FIG. 4 is a view illustrating a transmission and reception of a signal between the vehicle and the fob key.

FIG. 4 is a view illustrating a transmission and reception of a signal between the vehicle and the fob key.

As shown in FIG. 4, when the fob key 200 is placed within the LF signal transmittable and receivable distance, from the vehicle 100, and the fob key 200 includes the LF antenna, the fob key 200 may receive a LF signal from the vehicle 100 via the LF communication network and transmit a RF signal to the vehicle 100 via the RF communication network. In this case, the fob key 200 may estimate strength of the LF signal transmitted from the vehicle 100, and strength information of the LF signal may be transmitted to the vehicle 100 by being included in the RF signal. The vehicle 100 may estimate a distance between the driver and the vehicle 100 having the fob key 200, based on the strength information of the LF signal.

However, when the fob key 200 is not placed within the LF signal transmittable and receivable distance, from the vehicle 100, although the vehicle 100 transmits a LF signal to the surrounding via the LF communication network, the fob key 200 may not receive the LF signal. Therefore, the fob key 200 may not transmit the RF signal to the vehicle 100.

When the fob key 200 includes a three-dimensional low-frequency antenna (3D LF antenna), the fob key 200 may recognize a transmission direction of LE signal as well as strength of LF signal that is transmitted from the vehicle 100. In this case, the fob key 200 may transmit information related to the strength and direction of the LF signal to the vehicle 100 via the RF communication network, and thus a controller 130 of the vehicle 100 may detect a relative position of the driver with respect to the vehicle 100, as well as the distance between the driver and the vehicle 100 having the fob key 200, based on the strength and the direction information of the LF signal.

The vehicle 100 may be connected to a portable device including a user interface, aside from the fob key 200, via a short-range communication network.

Figure 5:
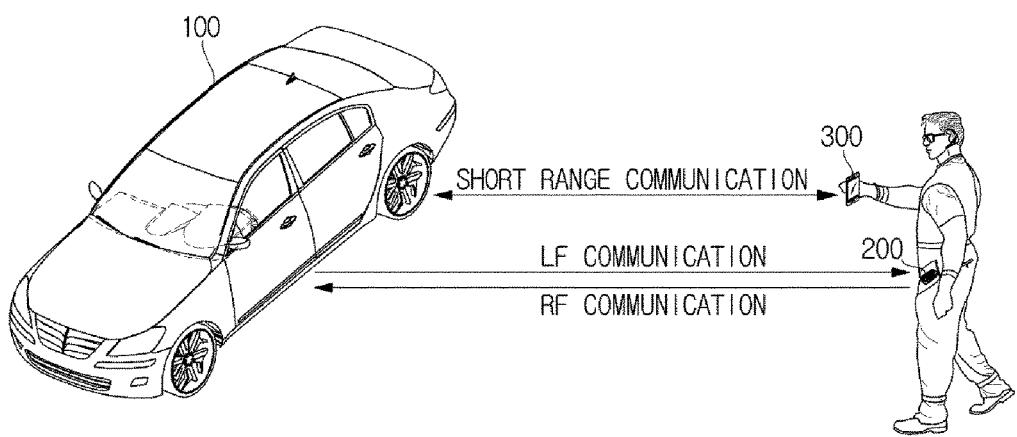
FIG. 5 is a view illustrating a portable device and a fob key connected to the vehicle in accordance with embodiments of the present disclosure.

FIG. 5 is a view illustrating a portable device and a fob key connected to the vehicle in accordance with embodiments of the present disclosure.

As shown in FIG. 5, the vehicle 100 may authenticate a driver via the LF and RF communication network with the fob key 200, and when the driver is authenticated, the vehicle 100 may receive a remote control signal of a portable device 300 via the short-range communication network. The remote control signal may include an autonomous driving control signal configured to control an autonomous driving of the vehicle 100.

Short-range communication may include Wireless LAN, Wi-Fi, Bluetooth, Zigbee, WFD (Wi-Fi Direct), UWB (ultra wideband), IrDA (infrared Data Association), BLE (Bluetooth Low Energy) and NFC (Near Field Communication), but is not limited thereto.

The portable device may be the kind of device to secure the portability and mobility and to have a user interface. The portable device may employ a mobile phone, but is not limited thereto. The portable device may include all kind of devices based on a handheld method, e.g., PCS (Personal Communication System), GSM (Global System for Mobile communications), PDC (Personal Digital Cellular), PHS (Personal Handyphone System), PDA (Personal Digital Assistant), IMT (International Mobile Telecommunication)-2000, CDMA (Code Division Multiple Access)-2000, W-CDMA (W-Code Division Multiple Access), WiBro (Wireless Broadband Internet) terminal, PMP (Portable Multimedia Player) terminal and smart phone, notebook, lap top, tablet PC, and slate PC in which WEB Browser is loaded.

Since an application for the control of the vehicle 100 is allowed to be installed in the portable device 300, the portable device 300 may be sold after the application is installed in the portable device 300 or the application may be downloaded from a server after the portable device 300 is sold.

Figure 6:
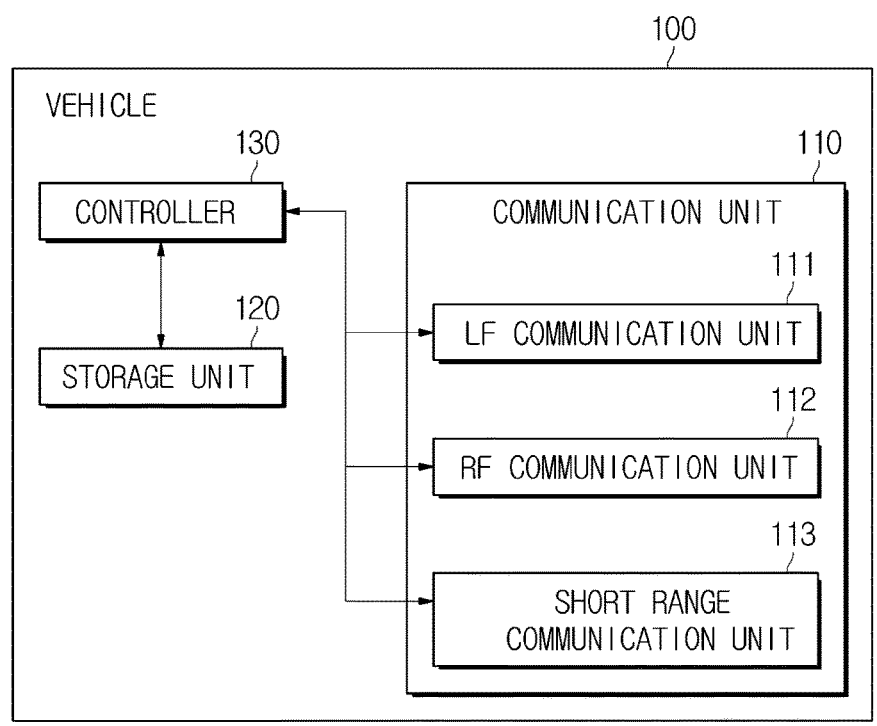
FIG. 6 is a control block diagram of the vehicle in accordance with embodiments of the present disclosure.

Hereinafter a detail configuration of the vehicle 100 will be described with reference to FIG. 6. FIG. 6 is a control block diagram of the vehicle in accordance with embodiments of the present disclosure.

As shown in FIG. 6, the vehicle 100 may include a communication unit 110 to transmit and receive a signal to and from the fob key 200 and the portable device 300, a storage unit 120 to store data, and a controller 130 to control an operation of a component of the vehicle 100.

The communication unit 110 of the vehicle 100 may include a LF communication unit 111 to transmit a LF signal within a LF signal transmittable and receivable distance, via the LF communication network; a RF communication unit 112 to receive a RF signal within a RF signal transmittable and receivable distance, via the RF communication network; and a short-range communication unit 113 to transmit and receive a short-range signal via the short-range communication network.

The LF communication unit 111 may transmit a LF signal for scanning the fob key 200 in the surrounding via the LF communication network.

The LF communication unit 111 may include a LF communication interface including a communication port configured to connect the LF communication network to the controller 130 and a transmitter configured to transmit a LF signal.

The LF communication unit 111 may further include a LF signal conversion module configured to modulate a digital control signal, which is output from the controller 130 via the LF communication interface according to the control of the controller 130, into a LF signal in the form of analog.

The RF communication unit 112 may receive a RF signal from the fob key 200 via the RF communication network.

The RF signal may correspond to a response signal that is transmitted from the fob key 200 receiving the LF signal. The RF signal may include authentication information that is inter-shared with the vehicle 100 and the fob key 200 and further include information related to the strength and direction of the LF signal received by the fob key 200.

The RF communication unit 112 may include a RF communication interface including a communication port configured to connect the RF communication network to the controller 130 and a receiver configured to receive a RF signal.

The RF communication unit 112 may further include a RF signal conversion module configured to demodulate a RF signal in the form of analog, which is received via the RF communication interface, into a digital control signal.

The control signal, the RF signal, and the LF signal of the vehicle 100 may have a different format.

The short-range communication unit 113 may transmit and receive a short-range signal to and from the portable device 300 within a short-range communication available range, via the short-range communication network.

The short-range communication unit 113 of the vehicle 100 may receive a vehicle control signal that is transmitted from the portable device 300 via the short-range communication network, and transmit a portable device control signal to the portable device 300. The vehicle control signal may include authentication code information for authenticating the portable device 300, and an autonomous driving control signal for control of the autonomous driving of the vehicle 100. The portable device control signal may include estimated position information of driver.

The short-range communication unit 113 may include a short-range communication interface including a communication port configured to connect the short-range communication network to the controller 130 and a transceiver configured to transmit and receive a short-range signal via the short-range communication.

The short-range communication unit 113 may further include a short-range signal conversion module configured to demodulate a short-range signal in the form of analog, which is received via the short-range communication interface, into a digital control signal or configured to modulate a digital control signal output from the controller 130 into a short-range signal in the form of analog.

The storage unit 120 may store authentication information that is inter-shared with the fob key 200 and the vehicle 100 and further store authentication code that is inter-shared with the portable device 300 and the vehicle 100.

The storage unit 120 may include a memory to store programs and data for controlling each component of the vehicle 100.

According to embodiments of the present disclosure, the storage unit 120 and the controller 130 may be implemented by a separated memory device and processor, or alternatively implemented by a single device.

The controller 130 may control each components included in the vehicle 100. The controller 130 may include a processor configured to generate a control signal according to a program and data stored in the storage unit 120.

For example, the controller 130 may authenticate the fob key 200 based on the authentication information included in the RF signal received from the fob key 200. When the authentication information received from the fob key 200 is identical to authentication information stored in the storage unit 120, the controller 130 may activate the short-range communication unit 113 and receive authentication code from the portable device 300 via the short-range communication network.

The controller 130 may estimate a position of driver having the fob key 200 based on the strength and direction information of the LF signal included in the RF signal.

In a state in which the controller 130 determines whether the driver having the fob key 200 is placed within the LF signal transmittable and receivable distance, when it is determined that the driver is placed within the LF signal transmittable and receivable distance, the controller 130 may authenticate the portable device 300 based on the authentication code transmitted from the portable device 300.

Further, the controller 130 may authenticate the portable device 300 based on the authentication code included in the short-range signal received from the portable device 300. When the authentication code transmitted from the portable device 300 is identical to the authentication code stored in the storage unit 120, the controller 130 may generate an authentication approval signal and allow the vehicle control of the portable device 300. The authentication approval signal may be transmitted to the portable device 300 by the short-range communication unit 113. When the vehicle control of the portable device 300 is allowed, the short-range communication unit 113 may receive a vehicle control signal related to the autonomous driving of the vehicle 100, from the portable device 300.

The controller 130 may perform a different control process about the vehicle 100 and the portable device 300 depending on a position of a driver. A detailed description thereof will be described later.

Figure 7:
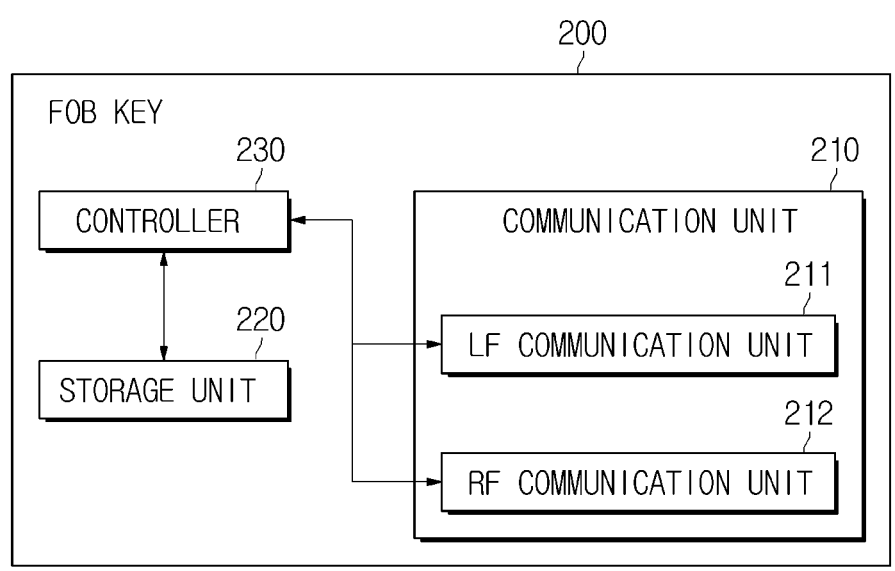
FIG. 7 is a control block diagram illustrating the fob key in accordance with embodiments of the present disclosure.

FIG. 7 is a control block diagram illustrating the fob key in accordance with embodiments of the present disclosure.

As shown in FIG. 7, the fob key 200 may include a communication unit 210 to send and receive a signal to and from the vehicle 100, a storage unit 220 to store data, and a controller 230 to control an operation of component of the fob key 200.

The communication unit 210 of the fob key 200 may include a LF communication unit 211 to transmit a LF signal within a LF signal transmittable and receivable distance, via the LF communication network, and a RF communication unit 212 to receive a RF signal within a RF signal transmittable and receivable distance, via the RF communication network.

The LF communication unit 211 may receive a LF signal via the LF communication network.

The LF communication unit 211 may include a LF communication interface including a communication port configured to connect the LF communication network to the controller 230 of the fob key 200 and a receiver configured to receive a LF signal. The receiver configured to receive a LF signal may include a 3D LF antenna, wherein the 3D LF antenna may detect strength and direction of the LF signal. The 3D LF antenna is well-known in the art, and thus a detailed description will be omitted.

The LF communication unit 211 may further include a LF signal conversion module configured to demodulate the LF signal in the form of analog, which is received via the LF communication interface, into a digital control signal.

The RF communication unit 212 may transmit a RF signal corresponding to the LF signal to the vehicle 100 via the RF communication network. The RF signal may include authentication information that is inter-shared with the fob key 200 and the vehicle 100 and further include information related to the strength and direction of the LF signal detected by the 3D LF antenna.

The RF communication unit 212 may further include a RF signal conversion module configured to modulate a digital control signal, which is output from the controller 230 via the RF communication interface according to the control of the controller 230, into a RF signal in the form of analog.

The control signal, the RF signal, and the LF signal of the fob key 200 may have a different format.

The storage unit 220 may store authentication information that is inter-shared with the fob key 200 and the vehicle 100.

For example, the storage unit 220 and the controller 230 may be implemented by a separated memory device and processor, or alternatively implemented by a single device.

The controller 230 may control each components included in the fob key 200.

The controller 230 may determine whether authentication information of the vehicle 100 included in the LF signal is identical to authentication information included in the fob key 200, and when it is determined that both authentication information are identical to each other, the controller 230 may transmit the RF signal to the vehicle 100.

The controller 230 may estimate a position of a driver with respect to the vehicle 100 based on the detected strength and direction of the LF signal, and the controller 230 may transmit the estimated position information to the vehicle 100 via the RF communication network. However, for the convenience of the description, the estimation of the position of the driver performed in the vehicle 100 will be described as an example.

The controller 230 may include a processor configured to generate a control signal according to a program and data stored in the storage unit 220.

Figure 8:
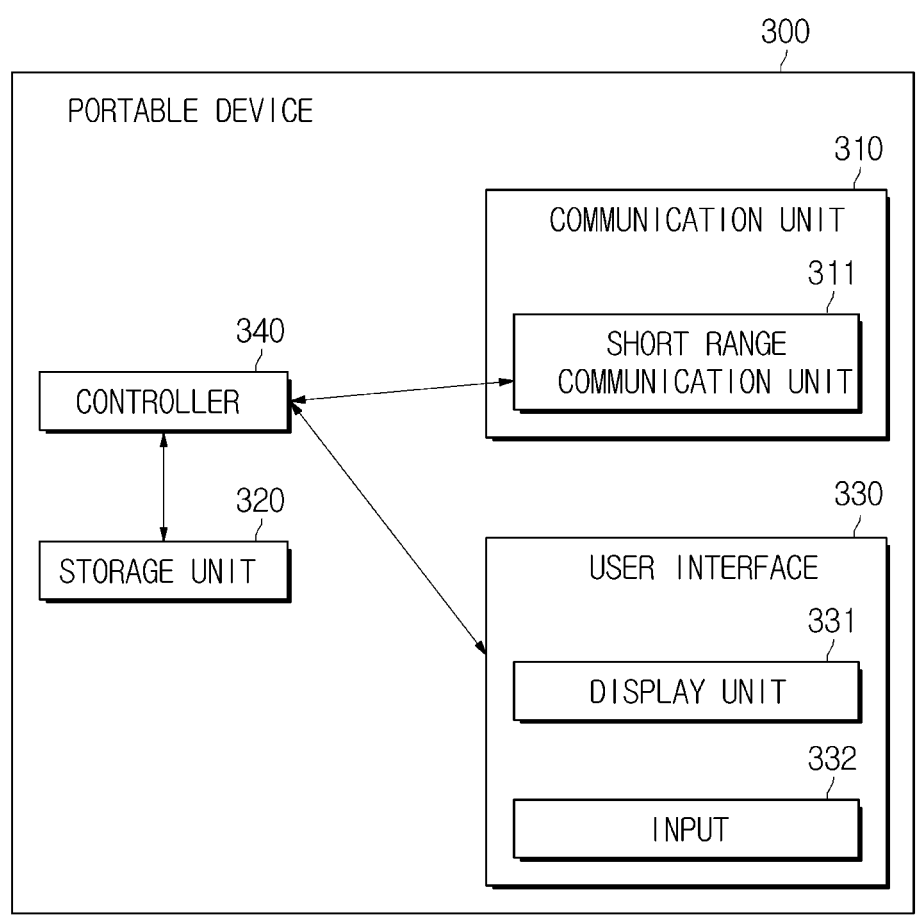
FIG. 8 is a control block diagram illustrating the portable device in accordance with embodiments of the present disclosure.

FIG. 8 is a control block diagram illustrating the portable device in accordance with embodiments of the present disclosure.

For example, the portable device 300 may include a communication unit 310 to send and receive a signal to and from the vehicle 100, a storage unit 320 to store data, a controller 340 to control an operation of component of the portable device 300 and a user interface 330.

The communication unit 310 may include a short-range communication unit 311 to transmit and receive a short-range signal within a short-range communication available range, via the short-range communication network.

The short-range communication unit 311 of the portable device 300 may receive a portable device control signal that is transmitted from the vehicle 100, and transmit a vehicle control signal to the vehicle 100 via the short-range communication network. The vehicle control signal may include authentication code information for authenticating the portable device 300, and a control signal for control of the autonomous driving of the vehicle 100. The portable device control signal may include estimated position information of driver. In this case, the user interface 330 of the portable device 300 may display a current position of the driver based on the received portable device control signal.

The short-range communication unit 311 may include a short-range communication interface including a communication port configured to connect the short-range communication network to the controller 340 and a transceiver configured to transmit and receive a short-range signal via the short-range communication network.

The short-range communication unit 311 may further include a short-range signal conversion module configured to demodulate a short-range signal in the form of analog, which is received via the short-range communication interface, into a digital control signal or configured to modulate a digital control signal output from the controller 340 into a short-range signal in the form of analog.

The storage unit 320 may store authentication code that is inter-shared with the portable device 300 and the vehicle 100.

The storage unit 320 may include a memory to store programs and data for controlling components of the portable device 300.

For example, the storage unit 320 and the controller 340 may be implemented by a separated memory device and processor, or alternatively implemented by a single device.

The user interface 330 may include a display unit 331 and an input 332. In addition, the user interface 330 may receive a user command for the control of the vehicle 100 or display a variety of information of the vehicle 100.

The display unit 331 may be implemented by CRT (Cathode Ray Tube), DLP (Digital Light Processing) panel, Plasma Display Penal, LCD (Liquid Crystal Display) panel, EL (Electro Luminescence) panel, EPD (Electrophoretic Display) panel, ECD (Electro chromic Display) panel, LED (Light Emitting Diode) panel or OLED (Organic Light Emitting Diode), but is not limited thereto.

The input 332 may include a hardware device for the input from the user, e.g. a variety of buttons, a switch, a pedal, a key board, a mouse, a track-ball, a variety of levers, a handle, and a stick. In addition, the input 332 may include a software device for the input from the user, e.g. a touch pad and GUI (Graphical User interface). The touch pad may be implemented by TSP (Touch Screen Panel) and thus the input 332 may have a mutual layer structure with the display unit 331.

As mentioned above, when the display unit 331 is configured with by the TSP that is to form a mutual layer structure with the touch pad, the display unit 331 may be used as the input 332. Hereinafter, for the convenience of the description, it will be assumed that the display unit 331 is configured with the touch screen panel.

The controller 340 may control each components included in the portable device 300.

The controller 340 may determine whether an authentication code of the vehicle 100 included in the short-range signal is identical to authentication code included in the portable device 300, and when it is determined that both authentication codes are identical to each other, the controller 340 may transmit the short-range signal to the vehicle 100 via the short-range communication network.

The controller 340 may display a current position of the driver on the user interface 330 in real-time, based on the current position information of the driver received from the vehicle 100. Further, the controller 340 may display a recommended control position of the driver on the user interface 330, based on recommended control position information received from the vehicle 100.

The control signal generated by the controller 340 may be transmitted to the vehicle 100 via the short-range communication unit 311, and the short-range signal received from the vehicle 100 may be received by the controller 340 via the short-range communication unit 311.

The controller 340 may include a processor to generate a control signal according to the program and data stored in the storage unit 320.

Hereinafter a signal transmission and reception process among the vehicle 100, the fob key 200 and the portable device 300 will be described with reference to FIGS. 9 and 10.

Figure 9:
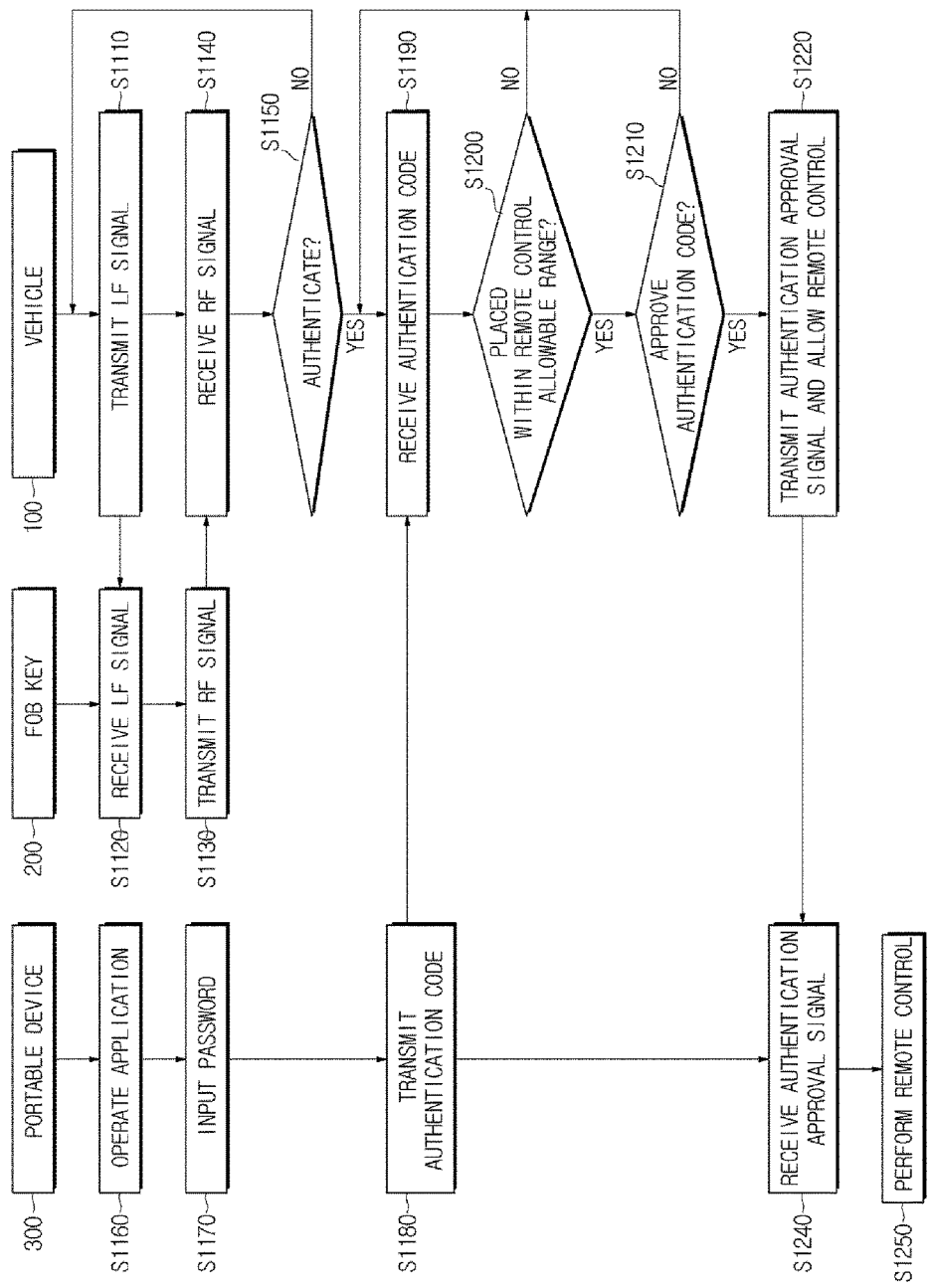
FIGS. 9 and 10 are flowcharts illustrating a control method of the vehicle, the fob key and the portable device in accordance with embodiments of the present disclosure.
Figure 10:
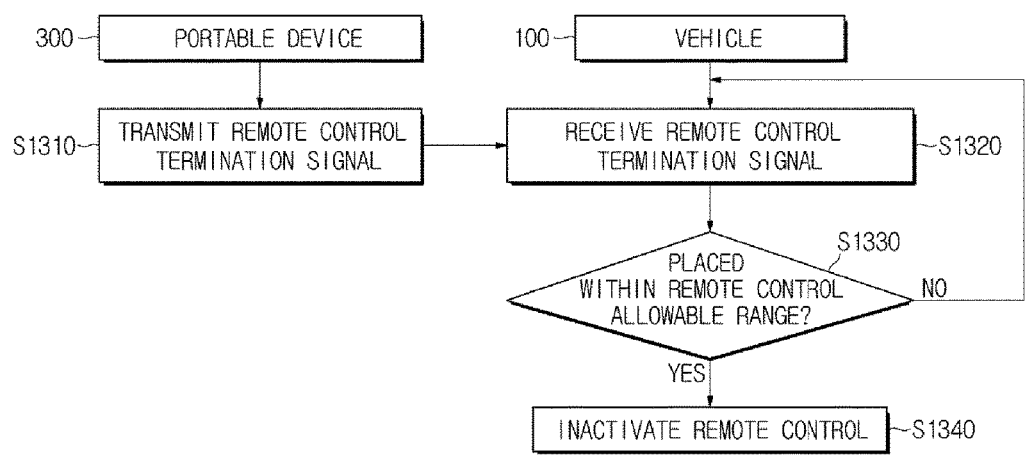

FIGS. 9 and 10 are flowcharts illustrating a control method of the vehicle, the fob key and the portable device in accordance with embodiments of the present disclosure.

Referring first to FIG. 9, the LF communication unit 111 of the vehicle 100 may transmit a LF signal to the LF signal transmittable and receivable range to scan the fob key 200 (1110), and the LF communication unit 211 of the fob key 200 may receive the LF signal (1120). When authentication information (i.e., "first authentication information") stored in the storage unit 220 of the fob key 200 is identical to authentication information (i.e., "second authentication information") received from the vehicle 100, the RF communication unit 212 of the fob key 200 may transmit a RF signal to the RF signal transmittable and receivable range (1130), and the RF communication unit 112 of the vehicle 100 may receive the RF signal (1140). The RF signal may include strength and direction information of the LF signal received by the fob key 200.

The controller 130 of the vehicle 100 may determine whether authentication information received from the fob key 200 is identical to authentication information stored in the storage unit 220 (1150), when it is determined that both authentication information are identical to each other, the controller 130 may approve the authentication of the fob key 200 (YES of 1150). When the authentication is approved, the vehicle 100 may permit a connection of the short-range communication unit 113, and receive authentication code from the portable device 300 via the short-range communication network (1190). In this case, in a state in which the controller 340 of the portable device 300 operates an application according to an operation of the driver (1160), when a password input from the driver is identical to a password stored in the storage unit 320 (1170), the short-range communication unit 311 may transmit the authentication code to the vehicle 100 and then the vehicle 100 may receive the authentication code (1180)

When the short-range communication unit 113 of the vehicle 100 receives the authentication code (1190), the controller 130 may estimate a position of a driver having the fob key 200 based on strength and direction information of the LF signal received from the fob key 200. The controller 130 of the vehicle 100 may determine whether the driver is placed within a predetermined range from the vehicle 100, based on the estimated position of the driver (i.e., a position of the fob key 200) (1200). The predetermined range may include a distance from the vehicle 100, e.g. the LF signal transmittable and receivable distance.

When the driver is placed within the predetermined range from the vehicle 100 (1200), the controller 130 of the vehicle 100 may determine whether the authentication code received from the portable device 300 (i.e., "second authentication code") is identical to the authentication code stored in the storage unit 120 (i.e., "first authentication code") (1210). When it is determined that both authentication codes are identical to each other (YES of 1210), the local area communication unit 113 may allow a vehicle remote control of the portable device 300 by transmitting an authentication approval signal to the portable device 300 (1220).

When the short-range communication unit 311 of the portable device 300 receives the authentication approval signal (1240), the vehicle remote control may be performed according to an operation of the user interface 330 by the driver (1250).

Referring next to FIG. 10, the driver may command terminating the remote control of the vehicle 100 by operating the user interface 330 of the portable device 300. In this case, the short-range communication unit 311 of the portable device 300 may transmit a remote control termination signal to the vehicle 100 (1310). When the short-range communication unit 113 of the vehicle 100 receives the remote control termination signal (1320), the controller 130 of the vehicle 100 may determine whether the driver is placed in the predetermined range from the vehicle 100 (1330).

When it is determined that the driver is placed in the predetermined range from the vehicle 100 (YES of 1330), the controller 130 of the vehicle 100 may approve the remote control termination command of the driver, and block the connection of the short-range communication unit 113, thereby inactivating the vehicle remote control of the portable device 300 (1340).

When the remote control between the portable device 300 and the vehicle 100 is activated (i.e., a connection of the short-range communication unit 113 of the vehicle 100), the driver may receive a variety of information related the vehicle 100 via the user interface 330 of the portable device 300 and input a variety of signal for the control of the vehicle 100. Hereinafter a variety of remote control processes between the vehicle 100 and the portable device 300 will be described.

Figure 11:
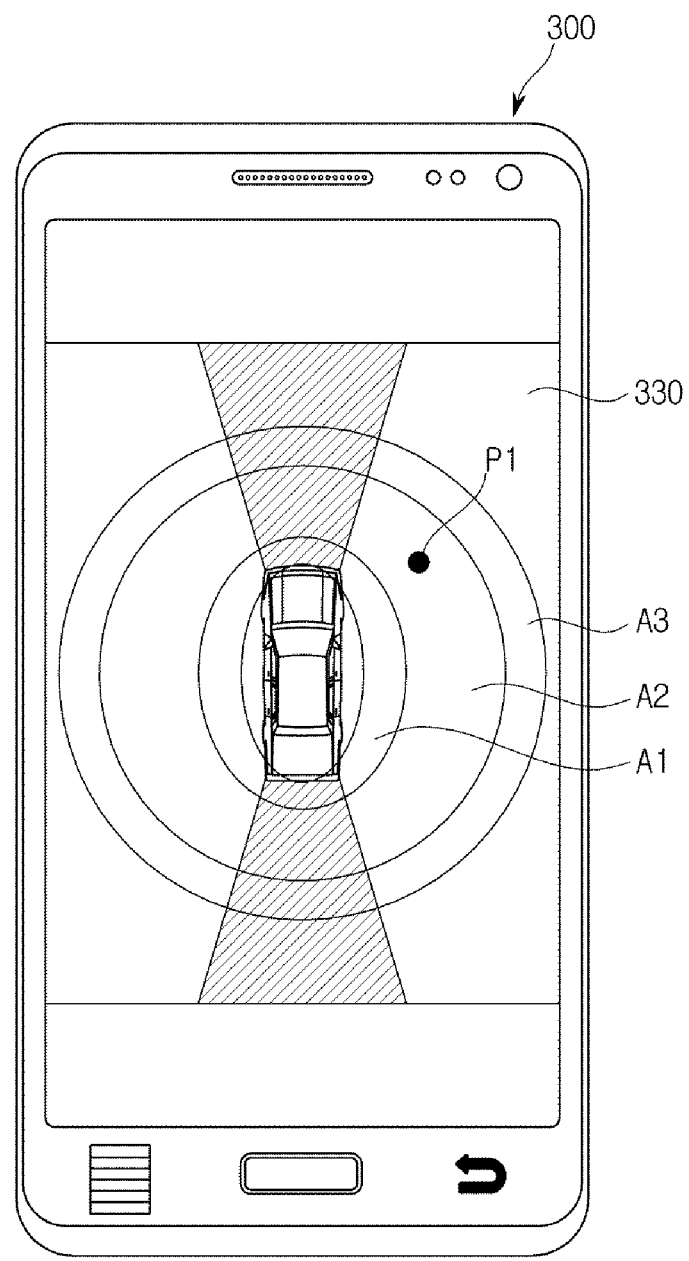
FIG. 11 is a view illustrating a screen provided on the user interface of the portable device.
Figure 12:
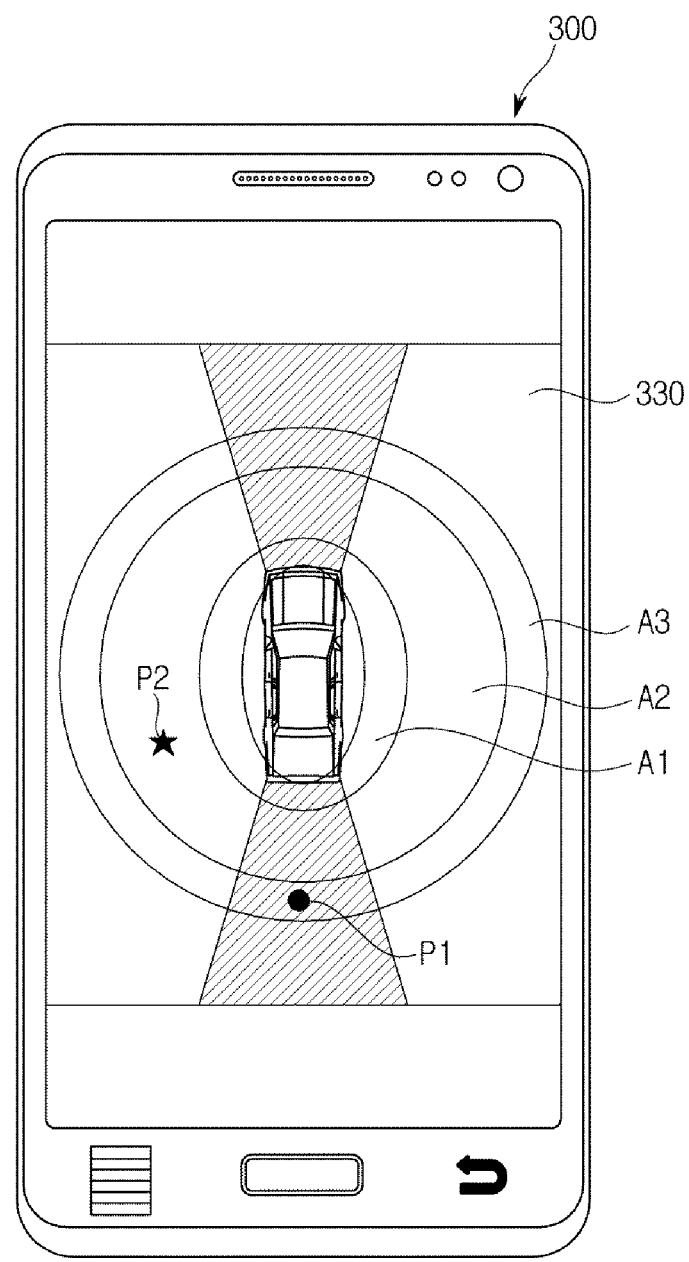
FIG. 12 is a view illustrating another screen provided on the user interface of the portable device.

FIG. 11 is a view illustrating a screen provided on the user interface of the portable device, and FIG. 12 is a view illustrating another screen provided on the user interface of the portable device.

According to embodiments of the present disclosure, the controller 130 of the vehicle 100 may set a plurality of vehicle controllable areas (A1-A3) having a predetermined range from the vehicle 100. Hereinafter, a case in which a first area (A1), a second area (A2) and a third area (A3) may be set with respect to a distance from the vehicle 100, will be described as an example.

The first area (A1) may correspond to an area having a distance of less than 50 cm from the vehicle 100, the second area (A2) may correspond to an area having a distance of more than 50 cm and less than 1.5 m from the vehicle 100, and the third area (A3) may correspond to an area having a distance of more than 1.5 m and less than 12 m from the vehicle 100. The third area (A3) may correspond to an area to a maximum distance in which the LF signal is allowed to be transmittable and receivable.

The controller 130 of the vehicle 100 may perform a different control process about the vehicle 100 and the portable device 300, based on a current position (P1) of a driver having the fob key 200.

Particularly, when a current position (P1) of a driver is in the first area (A1), the controller 130 of the vehicle 100 may determine that the driver is placed inside of the vehicle 100 and thus the controller 130 of the vehicle 100 may disapprove a vehicle retrieving control of the portable device 300 or stop the vehicle retrieving control that is continued. In this case, the controller 130 of the vehicle 100 may transmit a portable device control signal via the short-range communication unit 113, and the user interface 330 of the portable device 300 may stop displaying the current position (P1) of the driver according to the portable device control signal and output a guide message for the driver to move to the second area (A2) and the third area (A3).

When a current position (P1) of a driver is in the second area (A2), the controller 130 of the vehicle 100 may approve the vehicle retrieving control of the portable device 300 or continue the vehicle retrieving control that is already approved. In this case, the controller 130 of the vehicle 100 may transmit a portable device control signal via the short-range communication unit 113. The portable device 300 may display the current position (P1) of the driver according the portable device control signal and output a guide message or a vibration indicating that the driver may collide with the vehicle 100.

When a current position (P1) of a driver is in the third area (A3), the controller 130 of the vehicle 100 may determine that the driver is placed in a safe area. The controller 130 of the vehicle 100 may approve the vehicle retrieving control of the portable device 300 or continue the vehicle retrieving control that is already approved. In this case, the controller 130 of the vehicle 100 may transmit a portable device control signal via the short-range communication unit 113 and the portable device 300 may display the current position (P1) of the driver according the portable device control signal.

Meanwhile, the controller 130 of the vehicle 100 may perform a different control process about the vehicle 100 and the portable device 300 based on at least one of communication condition of the short-range communication unit 113 and the RF communication unit 112, as well as the current position (P1) of the driver that is determined based on the strength information of the LF signal received from the fob key 200.

Particularly, when the current position (P1) of the driver is in the first area (A1), when the RF communication unit 112 is incapable of receiving a RF signal, or when strength of a short-range signal received by the short-range communication unit 113 is less than a first predetermined reference value, the controller 130 of the vehicle 100 may determine that the driver is placed inside of the vehicle 100, and disapprove the vehicle retrieving control of the portable device 300 or stop the vehicle retrieving control that is continued. In this case, the controller 130 of the vehicle 100 may transmit a portable device control signal via the short-range communication unit 113, the user interface 330 of the portable device 300 may stop displaying the current position (P1) of the driver according to the portable device control signal, and output a guide message for the driver to move to the second area (A2) or the third area (A3).

When the current position (P1) of the driver is in the second area (A2) or when strength of a short-range signal received by the short-range communication unit 113 is less than a second predetermined reference value, which is predetermined to be a smaller value than the first predetermined reference value, the controller 130 of the vehicle 100 may approve the vehicle retrieving control of the portable device 300 or continue the vehicle retrieving control that is already approved. In this case, the controller 130 of the vehicle 100 may transmit a portable device control signal via the short-range communication unit 113. The portable device 300 may display the current position (P1) of the driver according the portable device control signal and output a guide message or a vibration indicating that the driver may collide with the vehicle 100.

When the current position (P1) of the driver is in the third area (A3), when the RF communication unit 112 is capable of receiving a RF signal, and when the short-range communication unit 113 is capable of transmitting and receiving a short-range signal, the controller 130 of the vehicle 100 may determine that the driver is placed in the safe area. The controller 130 of the vehicle 100 may approve the vehicle retrieving control of the portable device 300 or continue the vehicle retrieving control that is already approved. In this case, the controller 130 of the vehicle 100 may transmit a portable device control signal via the short-range communication unit 113 and the portable device 300 may display the current position (P1) of the driver according to the portable device control signal.

Referring now to FIG. 12, the controller 130 of the vehicle 100 may perform a different control process according to a direction in which a driver is placed, as well as an area in which a driver is placed.

Particularly, when the estimated current position (P1) of the driver is in the front side or the rear side of the vehicle 100, the controller 130 of the vehicle 100 may allow the portable device 300 to output a guide message or a vibration indicating that the driver may collide with the vehicle 100, disapprove the vehicle retrieving control of the portable device 300 or stop the vehicle retrieving control that is continued.

The controller 130 of the vehicle 100 may determine a recommended control position and allow the portable device 300 to display the current position (P1) of the driver together with the recommended control position. Further, when the current position (P1) of the driver and the recommended control position are identical to each other, the controller 130 of the vehicle 100 may approve the vehicle retrieving control of the portable device 300 or continue the vehicle retrieving control that is already approved.

Figure 13:
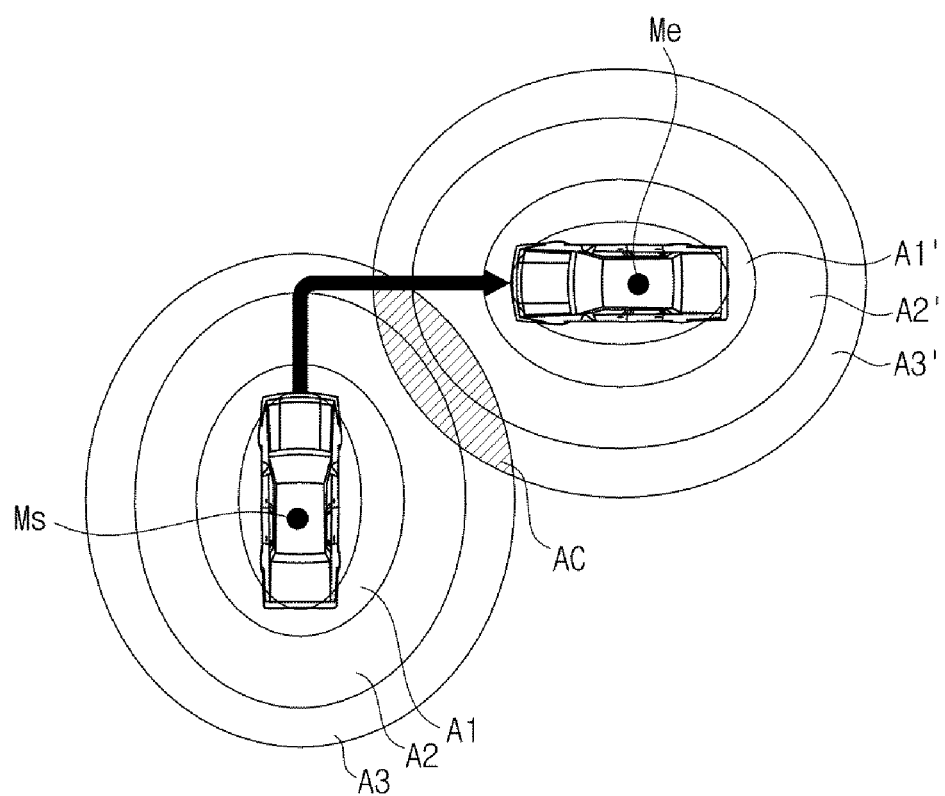
FIG. 13 is a schematic diagram illustrating a recommended control position of a driver when a vehicle retrieving control is performed.

FIG. 13 is a schematic diagram illustrating a recommended control position of a driver when a vehicle retrieving control is performed.

The short-range communication unit 113 of the vehicle 100 may receive a retrieving mode start signal from the portable device 300 and in this case, the controller 130 may determine a recommend control position of a driver.

Referring to FIG. 13, a recommended control position of a driver may represent a position for controlling the vehicle without an additional motion and without colliding with the driver and the vehicle 100 although the vehicle 100 is moved according to a vehicle retrieving control trajectory, wherein the recommended control position of a driver may correspond to an area (Ac) where a vehicle controllable area (A1-A3) at a point (Ms) where the vehicle 100 starts retrieving is overlapped with a vehicle controllable area (A1'-A3') at a point (Me) where retrieving of the vehicle 100 is completed.

The retrieving start point (Ms) and the retrieving completion point (Me) may be set by an autonomous parking control process and it is well known in the art. Therefore, a detail description thereof will be omitted.

Referring to FIG. 12, again, the short-range communication unit 113 of the communication unit 110 may transmit the recommended control position that is determined by the controller 130 and the current position of the driver having the fob key 200 to the portable device 300. The portable device 300 receiving the recommended control position and the current position of the driver may display the recommended control position (P2) and the current position (P1) of the driver having the fob key 200 via the user interface 330.

The controller 130 of the vehicle 100 may monitor the current position (P1) of the driver having the fob key 200 in real-time. When the driver having the fob key 200 is placed in the recommended control position (P2), and when a retrieving command of the vehicle 100 is received from the portable device 300, the controller 130 may control the vehicle 100 according to a predetermined retrieving control process.

However, the controller 130 may stop retrieving of the vehicle 100 when the driver having the fob key 200 is not placed in the recommended control position (P2).

Figure 14:
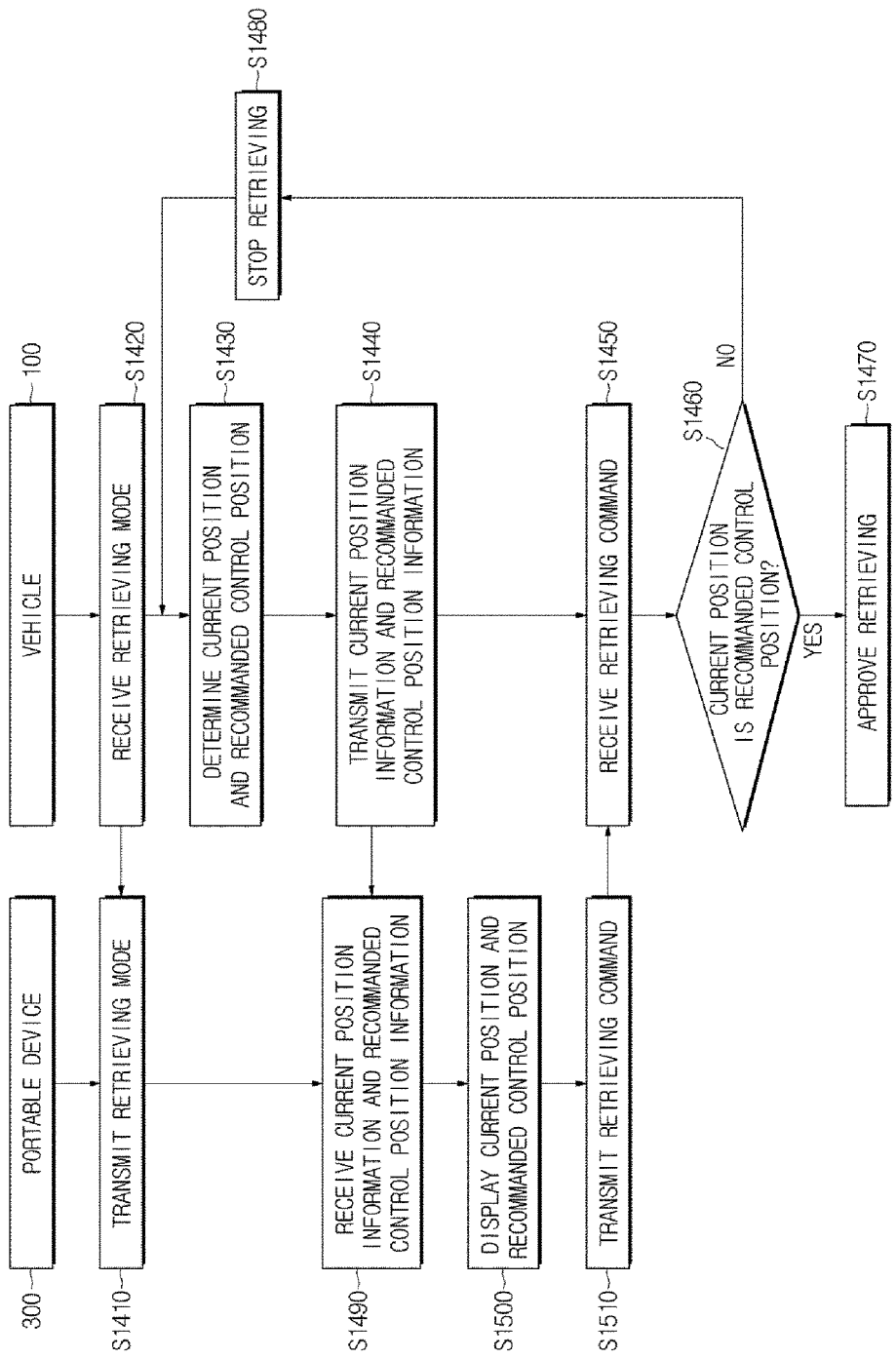
FIG. 14 is a flow chart illustrating a control method of the vehicle and the portable device performing a retrieving control in accordance with embodiments of the present disclosure.

Hereinafter a remote retrieving control method between the vehicle 100 and the portable device 300 will be described with reference to FIG. 14. FIG. 14 is a flow chart illustrating a control method of the vehicle and the portable device performing a retrieving control in accordance with embodiments of the present disclosure.

The portable device 300 allowed to control the vehicle 100 may transmit a retrieving mode start signal via the short-range communication unit 311 (1410). When the short-range communication unit 113 of the vehicle 100 connected to the portable device 300 receives the retrieving mode start signal (1420), the controller 130 of the vehicle 100 may determine a current position of a driver having the fob key 200 and a recommended control position (1430). The controller 130 of the vehicle 100 may transmit information related to the determined current position of the driver and the recommended control position to the portable device 300 (1440).

The short-range communication unit 311 of the portable device 300 may receive the information related to the determined current position of the driver and the recommended control position from the vehicle 100 (1490), and the user interface 330 of the portable device 300 may display the current position of the driver and the recommended control position to the driver (1500).

When the driver inputs a retrieving command of the vehicle 100 via the user interface 330 of the portable device 300, the short-range communication unit 311 of the portable device 300 may transmit the retrieving command to the vehicle 100 (1510). When the short-range communication unit 113 of the communication unit 110 receives the retrieving command (1450), the controller 130 of the vehicle 100 may determine whether a current position of the driver having the fob key 200 is identical to the recommended control position (1460).

When it is determined that the current position of the driver having the fob key 200 is identical to the recommended control position, the controller 130 of the vehicle 100 may approve a retrieving control signal of the portable device 300 (1470), and thus an autonomous parking control process of from a retrieving start point to a retrieving completion point may be performed.

However, when it is determined that the current position of the driver having the fob key 200 is not identical to the recommended control position, the controller 130 of the vehicle 100 may disapprove a vehicle retrieving control of the portable device 300 or stop the vehicle retrieving control that is continued (1480).

The above mentioned retrieving control process of the vehicle 100 may be applied to a parking control process and another autonomous driving of the vehicle 100.

Embodiments of the present disclosure have been described above. In the embodiments described above, some components may be implemented as a "module". Here, the term "module" means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

While the claimed invention been described with respect to a select number of embodiments, those skilled in the art, having the benefit of this disclosure, will appreciate that other embodiments can be devised which do not depart from the scope as disclosed herein. Accordingly, the scope of the present disclosure should be limited only by the attached claims.

What is claimed is:

1. A vehicle comprising:
    a communication unit performing a low frequency (LF) communication and a radio frequency (RF) communication with a fob key and performing a short-range communication with a portable device; and
    a controller estimating a position of a user having the fob key using the LF and RF communication with the fob key and controlling a connection between the portable device and the communication unit according to the estimated position of the user using the short-range communication with the portable device, wherein
    the controller establishes a retrieving start point of the vehicle and a retrieving completion point of the vehicle and determines an overlapping area of a vehicle controllable area at the retrieving start point of the vehicle and a vehicle controllable area at the retrieving completion point of the vehicle as a recommended control position,
    the communication unit receives a retrieving command from the portable device, and
    in response to receiving the retrieving command, the controller determines whether the recommended control position is identical to the estimated position of the user and moves the vehicle to the retrieving completion point when it is determined that the recommended control position is identical to the estimated position of the user.

2. The vehicle of claim 1, wherein the communication unit receives strength information of a LF signal from the fob key, and the controller estimates the position of the user based on the received strength information of the LF signal.

3. The vehicle of claim 2, wherein the controller estimates a distance between the user and the vehicle based on the strength information of the LF signal and permits the connection between the portable device and the communication unit when the estimated distance between the user and the vehicle is less than a predetermined reference distance.

4. The vehicle of claim 1, wherein the controller establishes a plurality of vehicle controllable areas having a predetermined range from the vehicle and controls the connection between the portable device and the communication unit using the short-range communication according to a vehicle controllable area among the plurality of vehicle controllable areas in which the user is located.

5. The vehicle of claim 4, wherein:
    the plurality of vehicle controllable areas includes a first area and a second area, and
    the controller blocks the connection between the portable device and the communication unit when the user is located in the first area and permits the connection between the portable device and the vehicle when the user is located in the second area.

6. The vehicle of claim 1, further comprising:
    a storage unit storing a first authentication code,
    wherein the communication unit receives a second authentication code from the portable device, and the controller permits the connection between the portable device and the communication unit when the distance between the user and the vehicle is less than a predetermined reference distance and the first authentication code stored in the storage unit is identical to the second authentication code received from the portable device.

7. The vehicle of claim 1, wherein the communication unit transmits position information of the user to the portable device.

8. The vehicle of claim 1, wherein the controller stops retrieving control of the vehicle when it is determined that the recommended control position is not identical to the estimated position of the user.

9. The vehicle of claim 1, wherein the communication unit transmits information related to the recommended control position to the portable device.

10. A controlling method of a vehicle, the method comprising:
    performing a low frequency (LF) communication and a radio frequency (RF) communication with a fob key;
    performing a short-range communication with a portable device;
    estimating a position of a user having the fob key using the LF and RF communication with the fob key;
    controlling a connection between the portable device and a communication unit of the vehicle according to the estimated position of the user using the short-range communication with the portable device;
    establishing a retrieving start point of the vehicle and a retrieving completion point of the vehicle;
    determining an overlapping area of a vehicle controllable area at the retrieving start point and a vehicle controllable area at the retrieving completion point as a recommended control position;
    receiving a retrieving command from the portable device;
    in response to receiving the retrieving command, determining whether the recommended control position is identical to the estimated position of the user; and
    moving the vehicle to the retrieving completion point when it is determined that the recommended control position is identical to the estimated position of the user.

11. The controlling method of claim 10, wherein:
    the performing of the LF and RF communication with the fob key comprises receiving strength information of a LF signal from the fob key; and
    the estimating of the position of the user comprises estimating a position of the user based on the received strength information of the LF signal.

12. The controlling method of claim 11, wherein:
    the estimating of the position of the user comprises estimating a distance between the user and the vehicle based on the strength information of the LF signal; and
    the controlling of the connection between the portable device and the communication unit comprises permitting a connection between the portable device and the communication unit when the distance between the user and the vehicle is less than a predetermined reference distance.

13. The controlling method of claim 10, wherein the controlling of the connection between the portable device and the communication unit comprises:

establishing a plurality of vehicle controllable areas having a predetermined range from the vehicle and controlling the connection between the portable device and the communication unit using the short-range communication according to a vehicle controllable area among the plurality of vehicle controllable areas in which the user is located.

14. The controlling method of claim 10 wherein, the controlling of the connection between the portable device and the communication unit comprises:

receiving a second authentication code from the portable device; and permitting the connection between the portable device and the communication unit when the distance between the user and the vehicle is less than the predetermined reference distance and a first authentication code stored in a storage unit is identical to the second authentication code received from the portable device.

15. The controlling method of claim 10, further comprising:

transmitting position information of the user to the portable device.

16. The controlling method of claim 10, further comprising:

stopping retrieving control of the vehicle when it is determined that the recommended control position is not identical to the estimated position of the user.

* * * * *